April 10, 1956 R. GAUTHIER 2,741,377
TOOL CARRIER FRAMES FOR ENDLESS-TRACK VEHICLES
Filed June 23, 1953 3 Sheets-Sheet 1

INVENTOR
RENÉ GAUTHIER

INVENTOR
RENÉ GAUTHIER

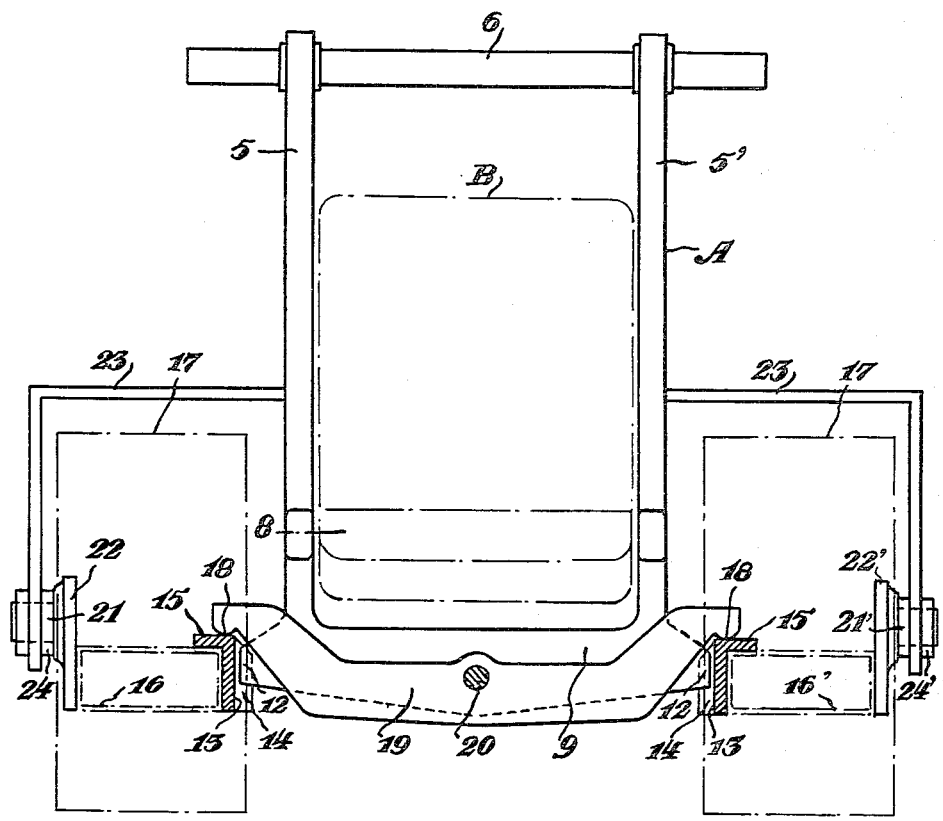

United States Patent Office 2,741,377
Patented Apr. 10, 1956

2,741,377

TOOL CARRIER FRAMES FOR ENDLESS-TRACK VEHICLES

René Gauthier, Cointe-Liege, Belgium

Application June 23, 1953, Serial No. 363,573

Claims priority, application Belgium June 26, 1952

3 Claims. (Cl. 214—130)

My invention is for improvements in or relating to endless-track vehicles and more particularly to endless-track vehicles on which tools such as grabs, cranes, elevators and the like are mounted.

According to the present invention, the tools carried by the endless-track vehicle are secured to a rigid auxiliary frame which is independent of the chassis of the vehicle and mounted on fittings which support the endless tracks of the vehicle, the said auxiliary frame being articulated on the one hand on shafts arranged in alignment with the axes of the driving wheels of the tracks and on the other hand through a system of articulations comprising a rocking lever and suitable guide means.

The invention will be more particularly described with reference to the accompanying drawings, in which:

Figure 3 illustrates in front elevation and partly in section on the line III—III of Figure 2 the said auxiliary frame.

Figure 1:
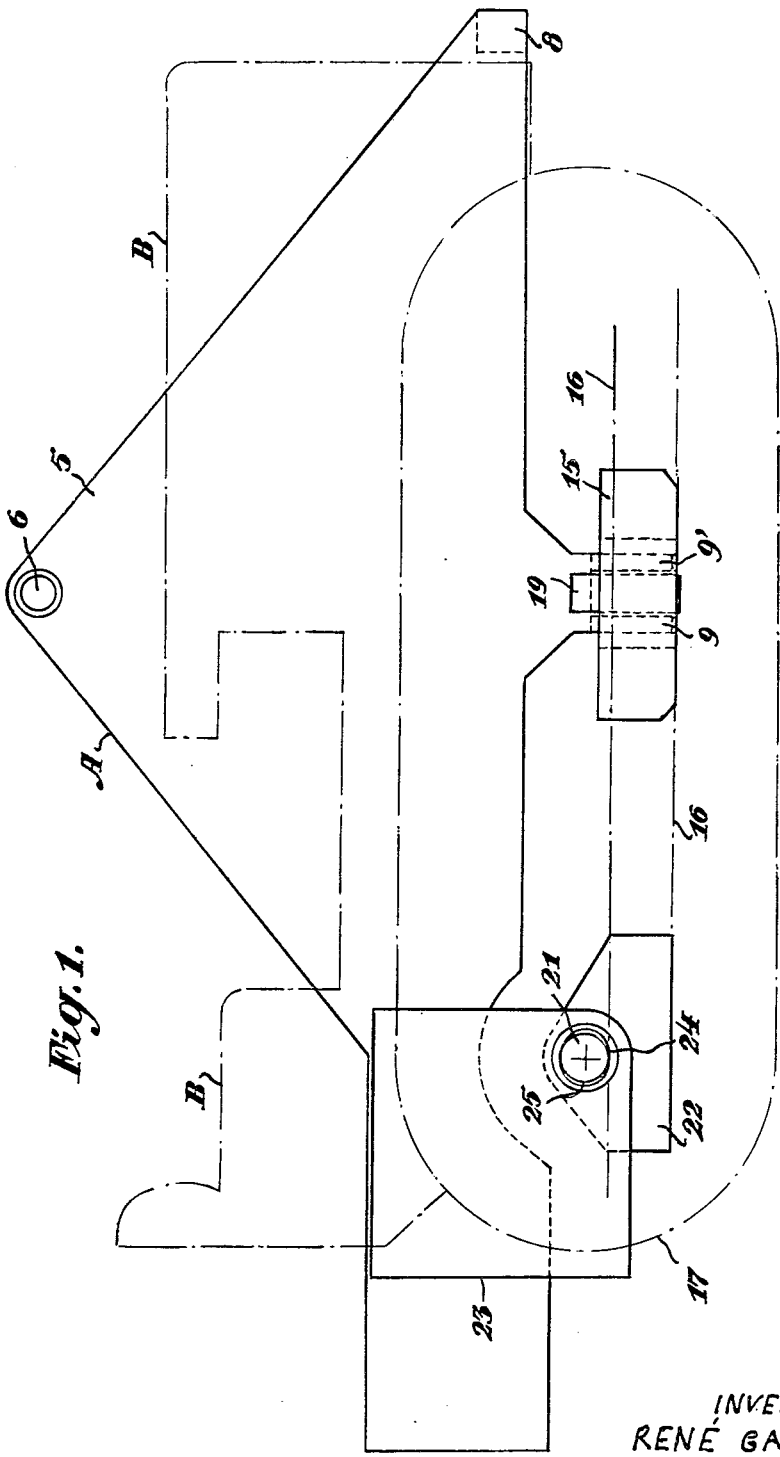
Figure 1 illustrates diagrammatically in side elevation an auxiliary frame constructed according to the present invention as applied to an endless-track vehicle.
Figure 2:
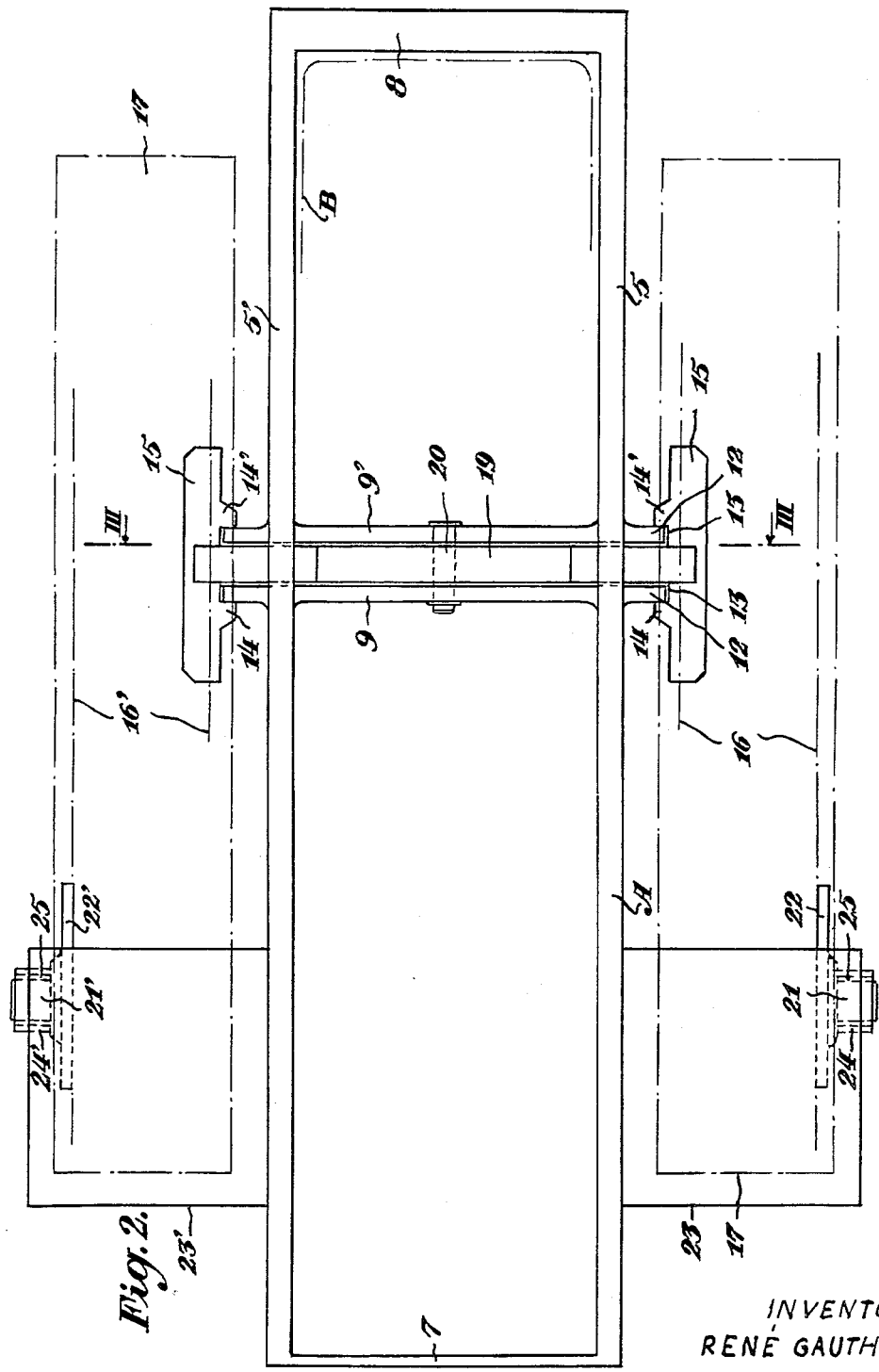
Figure 2 illustrates in plan the auxiliary frame illustrated in Figure 1 with some of the elements thereof omitted for the sake of clarity.

Referring to the drawings, an auxiliary frame A comprises two side members 5, 5', extending on either side of the chassis B of the vehicle which is shown in chain lines in the drawings. The side members 5, 5' are rigidly connected together by an upper cross member 6, front and rear stays 7 and 8 and two lower cross members 9 and 9'. The frame A is hingably mounted on shafts 21, 21' arranged in line with the axis of the driving wheels of the endless-tracks 17 and fast on plates 22, 22' secured to the outer side face of the fittings 16, 16' of the tracks 17. For this purpose, the frame A is provided with brackets 23, 23' rigidly secured to the outer face of the side members 5, 5' of the said frame, the said brackets each being provided with a bearing 24, 24' engaging the shafts 21, 21', The bore of the bearings 24, 24' is designed to permit slight longitudinal displacements 25 of the said bearings, and therefore of the frame A in relation to the shafts 21, 21' for reasons which will hereinafter be explained.

The lower cross members 9 and 9' extend parallel below the chassis B of the vehicle and the ends thereof are so guided as to be slideable vertically in guides 13 formed between abutments 14, 14' fixed relatively to supporting members 15 secured to the fittings 16, 16' of the mechanism which supports the endless track 17 of the vehicle.

The frame A rests at 18 on the upper face of the said members 15 through the intermediary of a rocking lever 19 extending between the cross members 9 and 9' and pivoted about a pin 20 extending in the direction of the longitudinal axis of the vehicle and arranged to engage in corresponding apertures formed in the central part of the said lower cross members 9, 9'.

The connection between the frame A and the fittings 16, 16' could of course be replaced by any known resilient system, for example a laminated arcuate spring secured to the central portion of the cross members 9, 9' and connected pivotally to the fittings 16, 16' of the endless tracks.

Owing to the manner in which the auxiliary tool carrier frame A is connected to the fittings of the endless tracks of the vehicle, the thrusts from the said tracks due to pushing, pulling or turning are transmitted to the said frame A through the medium of the abutments 14 provided on the members 15 of the fittings 16, which abutments constitute push members acting on the ends 12 of the cross members 9, 9'. The cross members 9, 9' are placed in the location which is most favorable, from a mechanical point of view, as far as the transmission of thrusts from the endless tracks to the rigid frame, and vice versa is concerned.

Since, however, the bore of the bearings 24, 24' is adapted to permit slight longitudinal displacements 25 of the said bearing with respect to the shafts 21, 21', it follows that the thrusts exerted by the fittings of the endless tracks on the frame A have no effect on the shafts 21, 21', even if some wear should occur in the guides 13 for the cross members 9, 9'.

The weight of the frame A and of the tools carried by the latter is the only one acting upon the shaft 21—21' and the supporting members 15 which are integral with the fittings of the endless tracks.

Due to the manner in which the tool carrier frame A is mounted on the fittings supporting the endless tracks of the vehicle, the frame B of the latter is completely preserved from the working reactions of the frame A and the endless tracks of the vehicle may also oscillate under the effect of differences in the level of the ground without influencing the frame B.

What I claim is:

1. In combination with a tool-carrying endless-track vehicle having a main frame, a transverse transmission shaft and fittings supporting the endless tracks at the ends of said shaft; an auxiliary frame independent of said main frame for carrying said tools, said auxiliary frame having two side members extending along either side of the main frame respectively, two stays connecting said side members, two parallel cross members provided at the forward portion of said auxiliary frame and extending underneath said main frame, a rocking lever arranged between said cross members, and supported on said fittings, a pivot engaging the center of said rocking lever, said cross members forming holes receiving said pivot, shafts secured to the outer faces of said fittings, respectively, bearings provided at the rearward end of said side members engaging said shafts with longitudinal play for said side members, vertical guide means at the inner faces of said fittings, respectively, provided for the ends of said cross members to transmit the longitudinal traction of said fittings to said auxiliary frame and to take up the thrusts imparted by the tools to the auxiliary frame.

2. An endless-track vehicle as defined in claim 1, including brackets rigidly secured to the side members of said auxiliary frame forming said bearings, said bearings having an oblong bore extending in the longitudinal direction of the vehicle.

3. An endless-track vehicle as defined in claim 1, wherein said shafts secured to the outer faces of said fittings are arranged in line with said transverse transmission shaft.

References Cited in the file of this patent

UNITED STATES PATENTS 2,519,974    Mork  ---------------- Jan. 17, 1950
2,656,893    Lindeman  ------------ Oct. 27, 1953